(12) United States Patent
Yu et al.

(10) Patent No.: US 11,483,373 B2
(45) Date of Patent: *Oct. 25, 2022

(54) MOBILE DEVICE, CONTROL METHOD THEREOF, MESSAGE SENDING APPARATUS AND MESSAGE SENDING METHOD

(71) Applicant: Samsung Electronics Co., Ltd., Gyeonggi-do (KR)

(72) Inventors: Seung-dong Yu, Gyeonggi-do (KR); Woo-yong Chang, Gyeonggi-do (KR); Se-jun Park, Gyeonggi-do (KR); Min-jeong Moon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 152 days.

This patent is subject to a terminal disclaimer.

(21) Appl. No.: 16/858,102

(22) Filed: Apr. 24, 2020

(65) Prior Publication Data
US 2020/0252446 A1 Aug. 6, 2020

Related U.S. Application Data

(60) Continuation of application No. 14/803,971, filed on Jul. 20, 2015, now Pat. No. 10,673,926, which is a
(Continued)

(30) Foreign Application Priority Data

Oct. 30, 2009 (KR) ........................ 10-2009-0104151

(51) Int. Cl.
*H04L 67/025* (2022.01)
*H04L 67/10* (2022.01)
(Continued)

(52) U.S. Cl.
CPC ........ *H04L 67/025* (2013.01); *G06F 3/04842* (2013.01); *G08C 17/00* (2013.01);
(Continued)

(58) Field of Classification Search
CPC ....... H04L 67/025; H04L 51/26; H04L 67/10; G06F 3/04842; G08C 17/00; G08C 2201/20; H04W 4/12
See application file for complete search history.

(56) References Cited

U.S. PATENT DOCUMENTS 7,308,253 B2    12/2007   Moody et al.
7,369,865 B2 *   5/2008   Gabriel .................. G06Q 20/40
                                                         455/406

(Continued)

FOREIGN PATENT DOCUMENTS

CN      101064604      10/2007
EP      2 107 740      10/2009
(Continued)

OTHER PUBLICATIONS

Chinese Office Action dated Nov. 3, 2017 issued in counterpart application No. 201080049023.1, 28 pages.
(Continued)

*Primary Examiner* — Qun Shen
(74) *Attorney, Agent, or Firm* — The Farrell Law Firm, P.C.

(57) ABSTRACT

Disclosed is a mobile device and a control method thereof. The mobile device includes a communication interface configured to perform communication via a network; a display configured to display an image; and a processor. The processor is configured to process a signal transmitted or received by the communication interface, control the display to display the image based on the processed signal, control the communication interface to transmit device information
(Continued)

of the mobile device to a server, wherein the mobile device is able to receive a message from a remote device through the communication interface, based on the server receiving reference information indicating that the remote device is set to a condition where the remote device is unable to receive the message, receive the message from the server, wherein the message is received through a counterpart device, and process the message to transmit a command to the remote device, such that the server remotely controls the remote device to transmit information requested by a user of the counterpart device corresponding to the command to the counterpart device.

14 Claims, 9 Drawing Sheets

Related U.S. Application Data division of application No. 12/916,017, filed on Oct. 29, 2010, now Pat. No. 9,105,177.

(51) Int. Cl.
*G06F 3/04842* (2022.01)
*H04L 51/226* (2022.01)
*G08C 17/00* (2006.01)
*H04W 4/12* (2009.01)

(52) U.S. Cl.
CPC ............ *H04L 51/226* (2022.05); *H04L 67/10* (2013.01); *G08C 2201/20* (2013.01); *H04W 4/12* (2013.01)

(56) References Cited

U.S. PATENT DOCUMENTS

| | | | |
|---|---|---|---|
| 2003/0105821 A1 | 6/2003 | Shah | |
| 2003/0161459 A1* | 8/2003 | McBlain | H04M 3/42229 379/220.01 |
| 2004/0073643 A1 | 4/2004 | Hayes et al. | |
| 2004/0082348 A1* | 4/2004 | Gabriel | G06Q 20/10 709/204 |
| 2004/0199663 A1* | 10/2004 | Horvitz | H04W 4/02 709/238 |
| 2005/0169253 A1 | 8/2005 | Hu | |
| 2005/0210232 A1 | 9/2005 | Hsu | |
| 2006/0178777 A1 | 8/2006 | Park et al. | |
| 2006/0198350 A1 | 9/2006 | Kim | |
| 2007/0011352 A1* | 1/2007 | Martini | H04L 45/02 709/239 |
| 2007/0072589 A1 | 3/2007 | Clarke | |
| 2007/0124406 A1* | 5/2007 | Liu | H04L 67/025 709/209 |
| 2007/0130274 A1 | 6/2007 | Lee et al. | |
| 2008/0021834 A1 | 1/2008 | Holla et al. | |
| 2008/0270560 A1 | 10/2008 | Tysowski | |
| 2008/0288605 A1* | 11/2008 | Major | G06Q 10/109 707/E17.109 |
| 2009/0299934 A1 | 12/2009 | Horvitz et al. | |
| 2010/0121744 A1 | 5/2010 | Belz et al. | |
| 2011/0053620 A1 | 3/2011 | Jarvenpaa | |
| 2011/0055015 A1 | 3/2011 | Gavita | |

FOREIGN PATENT DOCUMENTS

| | | |
|---|---|---|
| JP | 2002-30551 | 10/2002 |
| KR | 1020050046887 | 5/2005 |
| KR | 1020060076679 | 7/2006 |
| KR | 1020070043229 | 4/2007 |
| KR | 1020080088257 | 10/2008 |
| KR | 1020090070767 | 7/2009 |

OTHER PUBLICATIONS

European Search Report dated Nov. 10, 2016 issued in counterpart application No. 10827066.1-1855, 4 pages.
Chinese Office Action dated Nov. 3, 2016 issued in counterpart application No. 201080049023.1, 14 pages.
Chinese Office Action dated Dec. 3, 2015 issued in counterpart application No. 201080049023.1, 11 pages.
International Search Report dated Jul. 21, 2011 issued in counterpart application No. PCT/KR2010/007405, 3 pages.
European Search Report dated Apr. 17, 2014 issued in counterpart application No. 10827066.1-1855, 7 pages.
Korean Office Action dated Mar. 8, 2017 issued in counterpart application No. 10-2017-7005130, 4 pages.
Korean Office Action dated May 2, 2016 issued in counterpart application No. 10-2012-7008208, 13 pages.
Chinese Office Action dated May 5, 2016 issued in counterpart application No. 201080049023.1, 16 pages.
Chinese Office Action dated Jun. 1, 2017 issued in counterpart application No. 201080049023.1, 12 pages.

* cited by examiner

MOBILE DEVICE, CONTROL METHOD THEREOF, MESSAGE SENDING APPARATUS AND MESSAGE SENDING METHOD

PRIORITY

This application is a Continuation of application Ser. No. 14/803,971, filed on Jul. 20, 2015, which is a Divisional of application Ser. No. 12/916,017, filed on Oct. 29, 2010, issued as U.S. Pat. No. 9,105,177 on Aug. 11, 2015, which claims priority under 35 U.S.C. § 119(a) to a Korean Patent Application No. 10-2009-0104151, filed on Oct. 30, 2009 in the Korean Intellectual Property Office, the disclosure of each of which is incorporated herein by reference.

BACKGROUND OF THE INVENTION

1. Field of the Invention

The present invention relates generally to a mobile device, a control method thereof, a message sending apparatus and a message sending method, and more particularly, to a mobile device which is capable of accessing desired information more promptly and conveniently in response to receiving messages from other devices, a control method thereof, and a message sending apparatus and method.

2. Description of the Related Art

In recent years, functionality and performance of mobile devices such as mobile phones, personal digital assistants (PDAs), mobile personal computers (PCs) and the like has been increasingly improving. The use and interest of such mobile devices has been increasingly growing as well. Such mobile devices provide a function of exchanging messages such as characters, voice and the like with other devices, as well as call functionality and multimedia functionality for music, movies and the like.

When a user receives a message on a mobile device from any other device, the user may check the received message. In addition, for example, the user who checked the message may retrieve and find desired information from a database in the mobile device or may make a call with a user of the other device using the mobile terminal. In addition, the user may send a message to the other device using the mobile device. Further, the user may access a network such as wireless Internet to retrieve and find desired information on the network.

SUMMARY OF THE INVENTION

Accordingly, the present invention provides a mobile device which is capable of accessing desired information more promptly and conveniently in response to receiving messages from other devices, a control method thereof, a message sending apparatus and a message sending method.

According to an embodiment of the present invention, a mobile device is provided which includes a wireless communication unit which performs wireless communication via a wireless network; a signal processing unit which processes a signal transmitted/received by the wireless communication unit; a display unit which displays an image based on the signal processed by the signal processing unit; and a control unit which receives a message from a counterpart device, displays the received message on the display unit, remotely accesses a remote device, and controls the remote device to allow the mobile device to access information stored in the remote device.

The control unit may determine whether to receive the message based on an importance level of the message, if the message was delivered through the remote device, remotely access the remote device which delivered the message, receive reference information corresponding to a condition of user absence in the remote device and check that the message was delivered through the remote device based on the reference information, display a user selection User Interface (UI) for remote access to the remote device on the display unit, and the control unit may remotely access the remote device in response to input from the user through the selection UI.

The control unit may display a list of one or more accessible remote devices on the display unit, and the control unit may remotely access one selected from the displayed list of remote devices in response to input from a user. The control unit may remotely control the remote device to send the information stored in the remote device to the counterpart device.

According to another embodiment of the present invention, a control method of a mobile device is provided which includes performing wireless communication via a wireless network and receiving and displaying a message from a counterpart device; remotely accessing a remote device; and controlling the remote device to allow the mobile device to access information stored in the remote device.

The control method may further include determining whether to receive the message based on an importance level of the message.

Remotely accessing may include checking whether the message was delivered through the remote device and remotely accessing the remote device, which delivered the message, receiving reference information corresponding to a condition of user absence in the remote device; and checking that the message was delivered through the remote device based on the reference information.

The control method may further include displaying a selection UI for remote access to the remote device, and the remotely accessing may include remotely accessing the remote device in response to input from the user through the selection UI.

The control method may further include displaying a list of one or more accessible remote devices, and remotely accessing may include remotely accessing one device selected from the displayed list of remote devices in response to input from a user. According to another embodiment of the present invention, a message-sending server which sends a message to a mobile device is provided, which includes a communication unit which performs communication via a network; and a control unit which receives a message-sending request from a first device to a second device, checks whether the second device receives a message, and, if the second device is under a condition of user absence, controls the communication unit to send a message from the first device and reference information indicating that the second device is under the condition of user absence to the mobile device.

The message-sending server may further include a storing unit, which stores information related to a user account of the first device, and the control unit may perform a charging process for sending the message to the mobile device and reflect a result of the charging process in information related to the user account. The control unit may also add advertisement information to the message sent to the mobile device.

According to another embodiment of the present invention, a message sending method which sends a message to a mobile device using a message-sending server is provided, which includes receiving a message sending request from a first device to a second device via a network; checking whether the second device receives the message; and, if the second device is under a condition of user absence, sending the message from the first device and reference information indicating that the second device is under the condition of user absence to the mobile device.

The message sending method may further include performing a charging process for sending the message to the mobile device and reflecting a result of the charging process in information related to a user account of the first device. The message sending method may further include adding advertisement information to the message sent to the mobile device.

BRIEF DESCRIPTION OF THE DRAWINGS

The above and other aspects, features and advantages of certain embodiments of the present invention will become apparent and more readily appreciated from the following description, taken in conjunction with the accompanying drawings, in which.

DETAILED DESCRIPTION OF THE EMBODIMENTS OF THE PRESENT INVENTION

Figure 1:
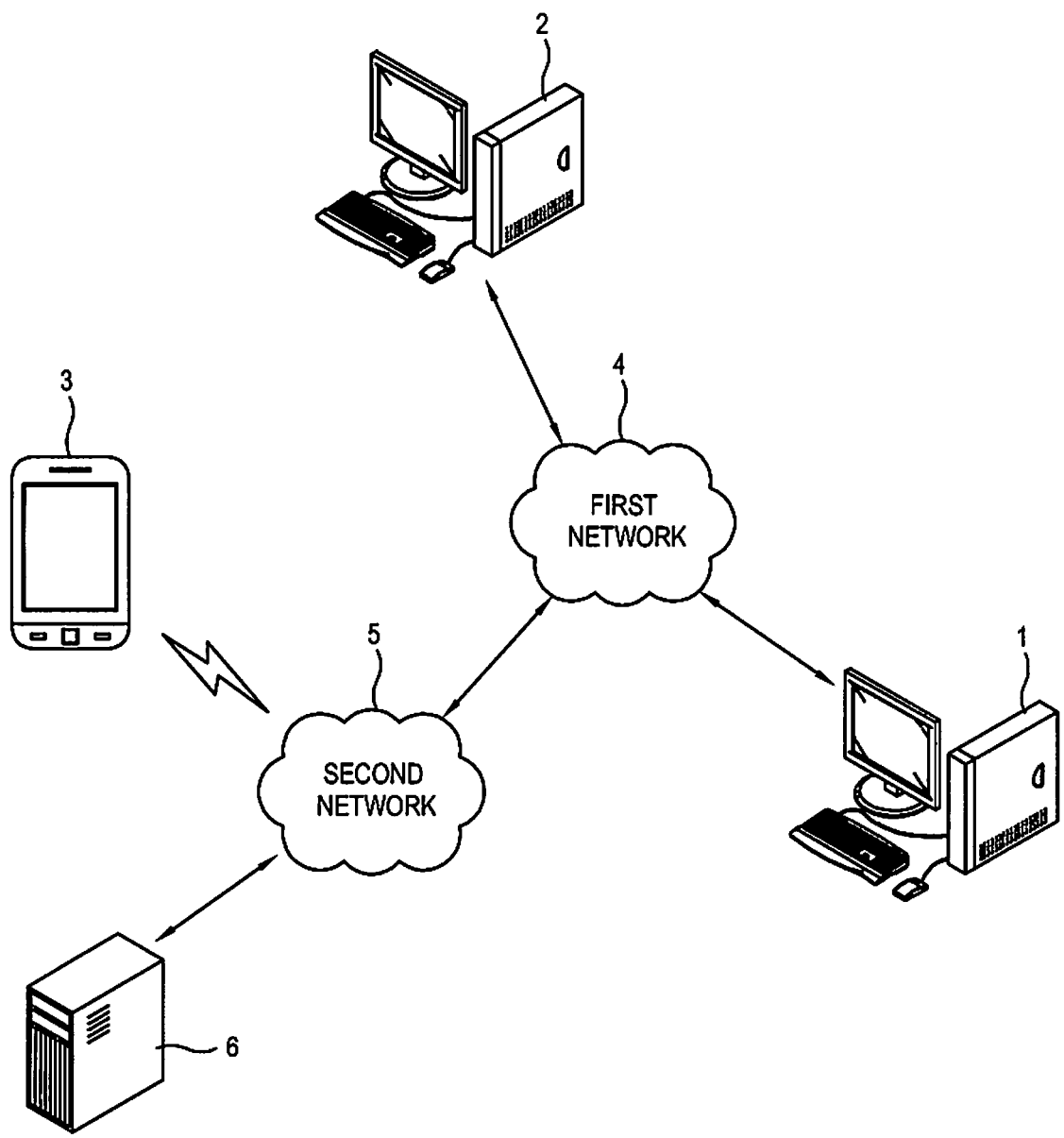
FIG. 1 is a diagram showing a mobile device and associated devices according to one embodiment of the present invention.

Hereinafter, embodiments of the present invention will be described in detail with reference to accompanying drawings so as to be easily understood by a person having ordinary skill in the art. Various changes and modifications of the embodiments described herein can be made without departing from the scope and spirit of the invention. In addition, descriptions of well-known functions and parts are omitted for clarity, and the same reference numerals refer to the same elements, features and structures throughout the drawings.

FIG. 1 is a diagram showing a mobile device and associated devices according to one embodiment of the present invention. This embodiment addresses responding to an information transmission request from a counterpart device 1 using a different device referenced by numeral 2, (hereinafter referred to as "remote device"), possessed by a user of a mobile device 3. In this embodiment, mobile device 3 may be implemented with a mobile phone, a PDA, a mobile PC, a game machine or the like. The remote device 2 of the user may be a computing system such as a desktop computer. Like remote device 2, counterpart device 1 may also be a computing system.

As shown in FIG. 1, remote device 2 of the user and counterpart device 1 are interconnected via a first network 4. In this embodiment, the first network 4 includes a local area network (LAN) as well as a wide area network (WAN) such as the Internet. In addition, the first network 4 may include both wired and wireless communication networks.

Mobile device 3 may access the first network 4 via a second network 5 including a wireless communication network, more specifically, a mobile telephone communication network and/or a wireless data communication network.

One or more message-sending servers 6 may intervene in communications among these devices 1, 2 and 3 using the first and second networks 4 and 5 shown in FIG. 1. In this embodiment, message-sending server 6 may include a communication unit (not shown) which is connected to a network for performing communication, and a controller (not shown) which performs a control to send a message via the communication unit. In this embodiment, message-sending server 6 connects to the second network 5, but is not limited thereto. For example, message-sending server 6 may be connected to the first network 4 or message-sending servers 6 may be connected to the first and second networks 4 and 5, respectively. In this embodiment, message-sending server 6 is only one example of a message-sending apparatus of the present invention. If a second separate server (not shown) is connected to the first network 4, basic message sending between counterpart device 1 and remote device 2 using first network 4 may be performed by the second server. If the user of remote device 2 cannot check a message received in remote device 2 due to user absence, the second server may deliver the message to message-sending server 6.

Figure 2:
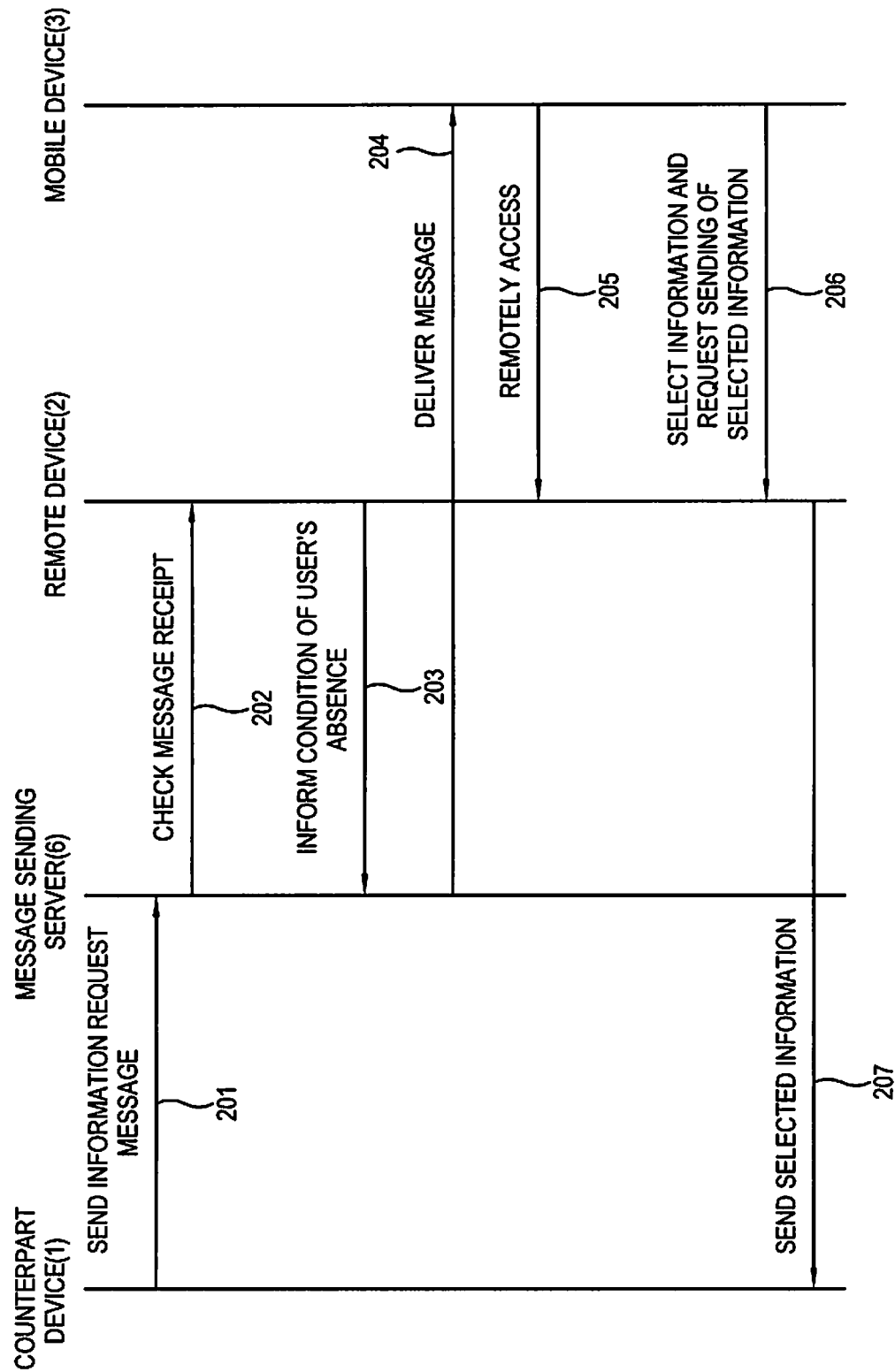
FIG. 2 is a diagram illustrating the interaction between the mobile device, the remote device and the counterpart device shown in FIG. 1.

Hereinafter, an operating process between the devices 1, 2 and 3 according to one embodiment of the present invention will be in detail with reference to FIG. 2. FIG. 2 shows an interaction between the devices 1, 2 and 3 according to one embodiment of the present invention. In this embodiment, it is assumed that a user of mobile device 3 is roaming within a range of access to mobile device 3 but is out of a range of direct access to the remote device 2. It is also assumed that information that a counterpart requests the user to send exists in remote device 2.

First, the counterpart uses counterpart device 1 to send an information-requesting message to remote device 2 of the user in order to request the user to send information desired by the counterpart, in step 201. In this embodiment, the information requesting message may include texts, voice, images, video and so on, as an instant message such as through a messenger or the like. This message from counterpart device 1 is sent to message-sending server 6, which then determines whether or not remote device 2 can receive the message, in step 202. In an alternative embodiment, the above-mentioned second server may determine whether or not remote device 2 can receive the message. If remote device 2 cannot receive the message, the second server may send the message from counterpart device 1 to message-sending server 6.

Remote device 2 might be set to a condition where remote device 2 cannot receive a message, i.e., an "in absence" condition, through a setting by the user. In response to a query from message-sending server 6 (or the second server), remote device 2 may inform message-sending server 6 (or the second server) of the "in absence" condition, i.e., that remote device 1 itself cannot receive the message in step 203. At this time, remote device 2 may provide message-sending server 6 with device information of mobile device 3 through which the user can receive the message. In response to receiving the device information, message-sending server 6 delivers the message to mobile device 3 based on the received device information of mobile device 3 in step 204.

In another embodiment of the present invention, message-sending server 6 may store and manage information required to send a message from counterpart device 1 to remote device 2 and/or mobile device 3. For example, message-sending server 6 may store and manage information on a user of counterpart 1 and information on the user of remote device 2 and mobile device 3 (hereinafter collectively referred to as "user information"). User information may include a user's name, ID, password, e-mail address, telephone number and the like. Upon delivering a message received from counterpart device 1 to mobile device 3, message-sending server 6 may identify or specify mobile device 3 of the user based on user information. The second server may also store and manage user information required for message exchange between counterpart device 1 and remote device 2. If the user of remote device 2 is during his/her absence, upon delivering a message from counterpart device 1, the second server may pass the user information of remote device 2 to message-sending server 6.

After the step 204, the user checks the message and makes a remote access to remote device 2 using mobile device 3 in step 205. The user searches for and selects desired information stored in remote device 2 through mobile device 3 and requests remote device 2 to send the selected information to counterpart device 1 in step 206. In response to the request from the user, remote device 2 sends the information to counterpart device 1 in step 207.

In this manner, according to the one embodiment of the present invention, even when the user has a difficulty in making a direct access to information to be sent due to spatial constraints or the like, the information can be sent to a counterpart through remote control, resulting in improved convenience of the user and maximized utilization of the mobile device.

Figure 3:
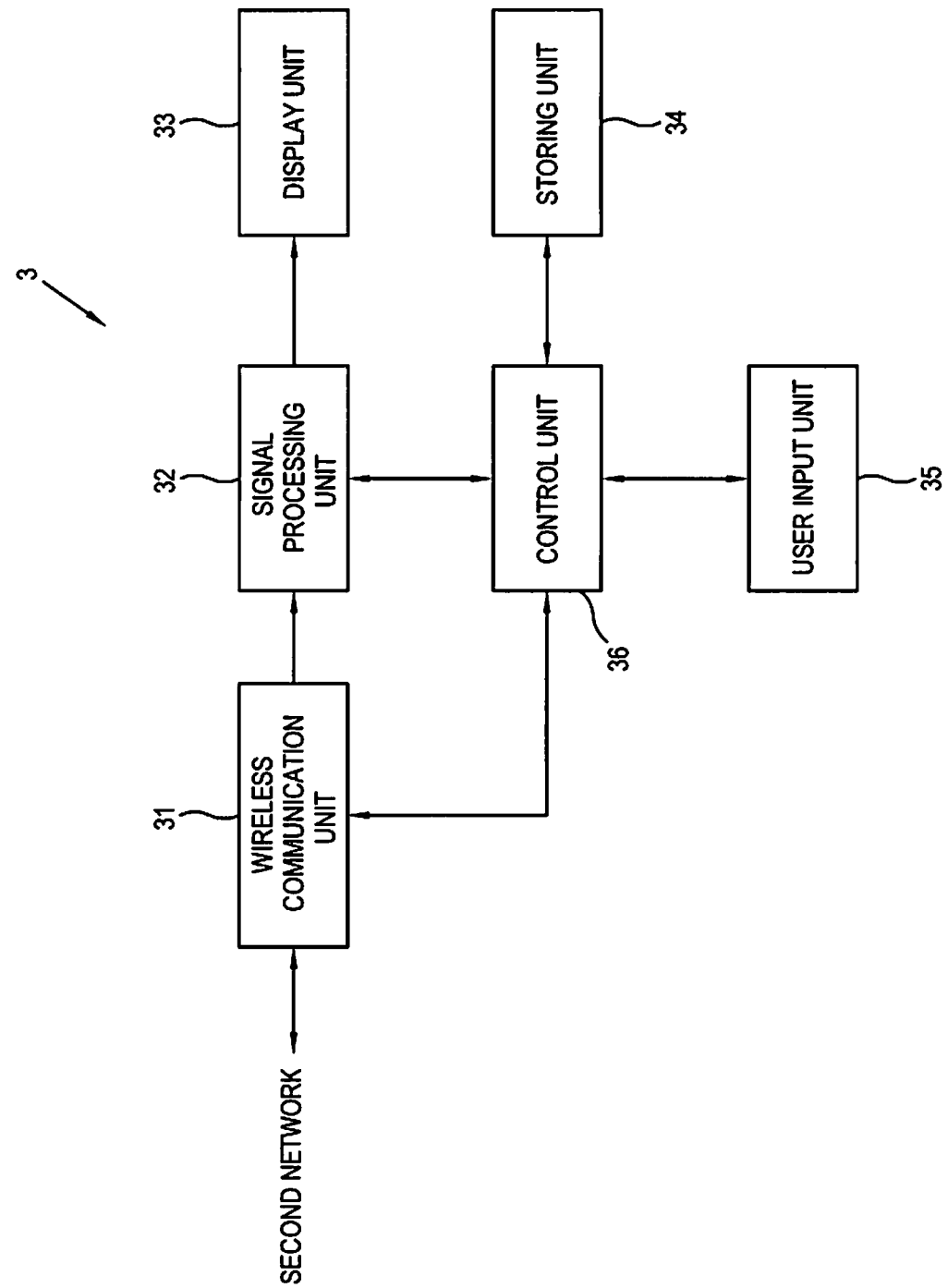
FIG. 3 is a block diagram showing a configuration of the mobile device shown in FIG. 1.

Hereinafter, mobile device 3 according to one embodiment will be described in more detail with reference to FIG. 3. FIG. 3 is a block diagram showing a configuration of mobile device 3 according to one embodiment of the present invention. 1. As shown in FIG. 3, mobile device 3 may include a wireless communication unit 31, a signal processing unit 32, a display unit 33, a storing unit 34, a user input unit 35 and a control unit 36.

The wireless communication unit 31 performs wireless communication with the second network 5. The system of communication performed by wireless communication unit 31 corresponds to the second network 5 and includes a mobile telephone communication network, a wireless data communication network or the like. Wireless communication unit 31 may communicate using two or more communication systems, in which case it may perform communication in different ways depending on situations under control of control unit 36. For example, under the control of control unit 36, wireless communication unit 31 may be changed from 3G type communication to Wi-Fi type communication, and vice versa.

The signal processing unit 32 processes a signal transmitted or received by wireless communication unit 31. Signal processing performed by signal processing unit 32 is according to the format of the transmitted or received signal. Display unit 33 displays an image based on the signal processed by signal processing unit 32. The storing unit 34 is a nonvolatile memory for storing information and data of mobile device 3, such as a flash memory or the like. The user input unit 35 receives an input from a user and delivers the input to the control unit 36.

Control unit 36 controls the overall operation of mobile device 3. In this embodiment, control unit 36 receives an information request message from counterpart device 1, informs the user of the received message, and remotely accesses remote device 2 to control remote device 2 to send information requested by counterpart device 1 to counterpart device 1.

Hereinafter, the operation of control unit 36 according to one embodiment of the present invention will be described in more detail with reference to FIG. 4. First, in step 401, upon receiving the information request message from counterpart device 1, control unit 36 informs the user, of message reception, by displaying contents of the message on display unit 33. FIG. 5 shows an example of an information request message 37 from the counter device 1 which is displayed on display unit 33 according to one embodiment of the present invention. As described earlier, the information request message from counterpart device 1 may be in a format of text, voice, image, moving picture, or a combination thereof, and the like, in each case of which control unit 36 may control a corresponding configuration such that the message can be output according to its format.

Control unit 36 may determine whether or not to receive the information request message based on a level of importance of the information request message. The importance level of the information request message may be defined based on whether or not a counterpart is a person registered with an address book or a telephone directory, counterpart identity information, user (recipient) relationship information or the like. Such information required to define the importance level of the information request message (hereinafter referred to as "importance level definition information") may be beforehand stored in the storing unit 34 of mobile device 3. Referring to FIG. 2 again, before sending the information request message to mobile device 3, message-sending server 6 may inquire of mobile device 3 whether or not it receives the information request message. If mobile device 3 rejects to receive the information request message, message-sending server 6 may not send the message to mobile device 3.

More specifically, message-sending server 6 informs mobile device 3 that counterpart device 1 sent the information request message to mobile device 3 and sends information on a counterpart to mobile device 3. Control unit 36 determines whether or not the current information request message is important based on sent counterpart information and pre-stored importance level definition information. If it is determined that the information request message is not important, control unit 36 may cause the information request message from counterpart device 1 not to be received at mobile device 3. For example, if it is checked that a counterpart of the current information request message is not a person registered with a pre-stored address book or telephone directory, control unit 36 may cause the information request message not to be received at mobile device 3. As a result, as the information request message is caused to be received selectively based on its importance level, it is possible to increase convenience for the user of mobile device 3 and prevent wasteful charges due to receipt of insignificant messages.

If message-sending server 6 delivers a message to mobile device 3 during user absence in remote device 2, it may perform an additional charging process. In this embodiment, the user of counterpart device 1 which sent the information request message may be charged with a fee. More specifically, message-sending server 6 may provide for a user account of counterpart device 1 which sent the message and perform a charging process with information on charging for the message reflected in the user account of counterpart device 1. Message-sending server 6 may add advertisement information, which can be displayed on mobile device 3, to the message sent to mobile device 3 and exempt or discount a corresponding charge. The user of counterpart device 1 may choose to allow or disallow the addition of advertisement information to the message at the time of sending the message.

Referring to FIG. 4 again, control unit 36 checks whether or not the received message was delivered through remote device 2 in step 402. If message-sending server 6 delivers the message to mobile device 3 during user absence in remote device 2, it may send information indicating this fact (hereinafter referred to as "reference information") to mobile device 3 along with the message. control unit 36 may check whether or not the received message was delivered through remote device 2 based on the reference information sent from message-sending server 6 along with the message. That is, in this embodiment, upon receiving the reference information indicating that an attempt was made to send the message from message-sending server 6 to remote device 2, along with the message, control unit 36 may perform a remote access to remote device 2 accordingly. In this embodiment, the reference information may include information on an entity which sent or delivered the message, information on a message delivery path, etc. Mobile device 3 may initiate the remote access to remote device 6 based on the reference information.

In another embodiment, the reference information may include information on conditions of remote device 2. For example, reference information may be information indicating a condition where remote device 2 cannot receive the message, i.e., a condition where the user is "in absence." In this case, as described earlier, message-sending server 6 may check for user absence in remote device 2 on the attempt to deliver the message to remote device 2, and deliver the corresponding reference information to mobile device 3 along with the message. Upon receiving the reference information indicating user absence in remote device 2 along with the message, mobile device 3 may initiate a remote access to remote device 2.

If upon checking it is established that the received message was not delivered through remote device 2, the process ends. On the contrary, if it is established that the received message was delivered through remote device 2, control unit 36 perform a remote access to remote device 2 in step 403. The remote access of mobile device 3 to remote device 2 is enabled by using at least one server (not shown) to support a function required for the remote access (hereinafter referred to as "remote access server"). The remote access server accesses the first network 4 and/or the second network 5 to enable remote control between remote device 2 and mobile device 3. The remote access server establishes a communication channel between remote device 2 and mobile device 3 to exchange commands, data and so on related to remote control.

Figure 6:
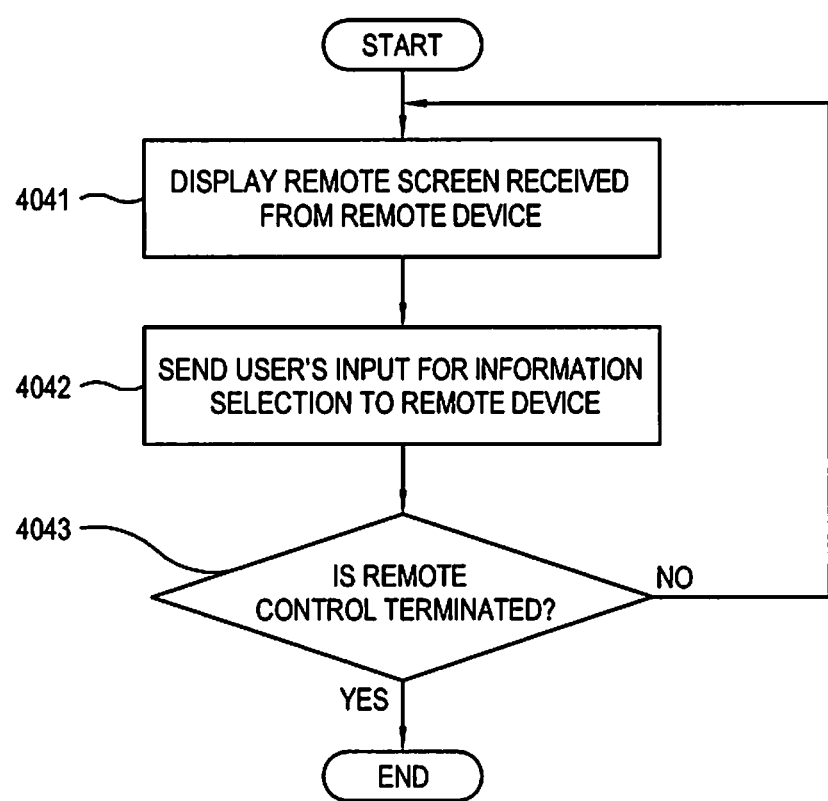
FIG. 6 is a flow chart showing detailed operation of the mobile device shown in FIG. 3.

Next, through remote access to remote device 2, control unit 36 remotely controls remote device 2 to send information requested by a user of counterpart device 1 to counterpart device 1 in step 404. FIG. 6 is a flow chart showing a process of remotely controlling remote device 2, which is performed by control unit 36 according to one embodiment of the present invention.

Figure 7:
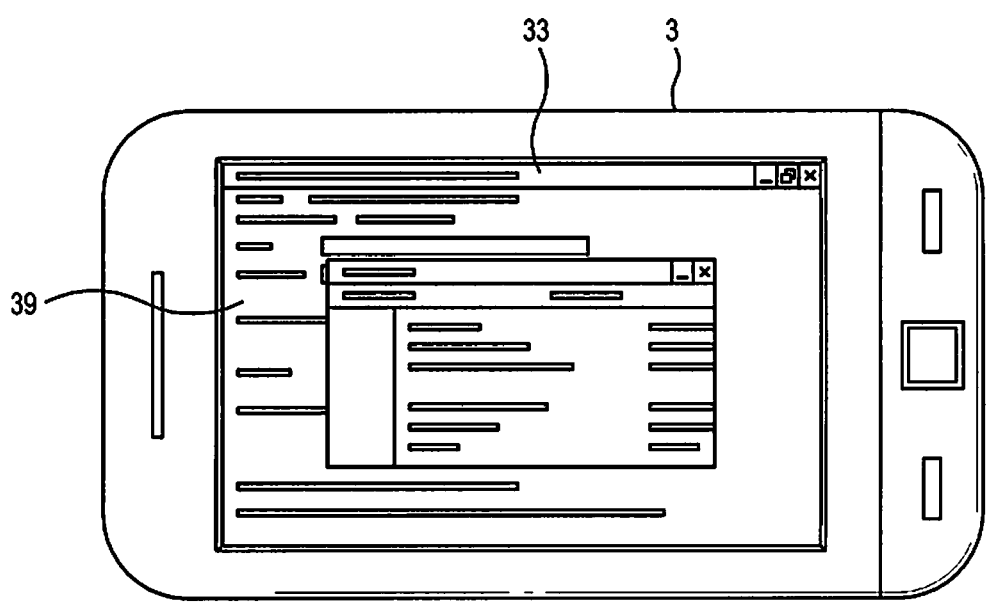
FIG. 7 is a diagram showing an example of a remote screen of the remote device, displayed on the mobile device shown in FIG. 3.

Referring to FIG. 6, on the completion of remote access to remote device 2, control unit 36 processes a remote screen received from remote device 2 and displays the processed screen on display unit 33 in step 4041. FIG. 7 shows an example of a remote screen 39 displayed on display unit 33 according to one embodiment of the present invention. A user makes an access t remote device 2 through the remote screen 39 displayed on display unit 33.

Control unit 36 sends input from the user through the user input unit 35 to remote device 2 in step 4042. Accordingly, the user may use mobile device 3 to retrieve and select information, which is requested by a counterpart, from remote device 2 and sends the selected information from remote device 2 to the counter device 1. For example, the user may use mobile device 3 to execute a mail application program of remote device 2 to designate counterpart device 1 and send mail with a file attachment of the selected information to counterpart device 1.

Control unit 36 determines whether or not the remote control for remote device 2 is terminated depending on an input from the user in operation 4043. If it is determined that remote control is terminated, the process ends. Otherwise, the process returns to operation 4041.

Figure 8:
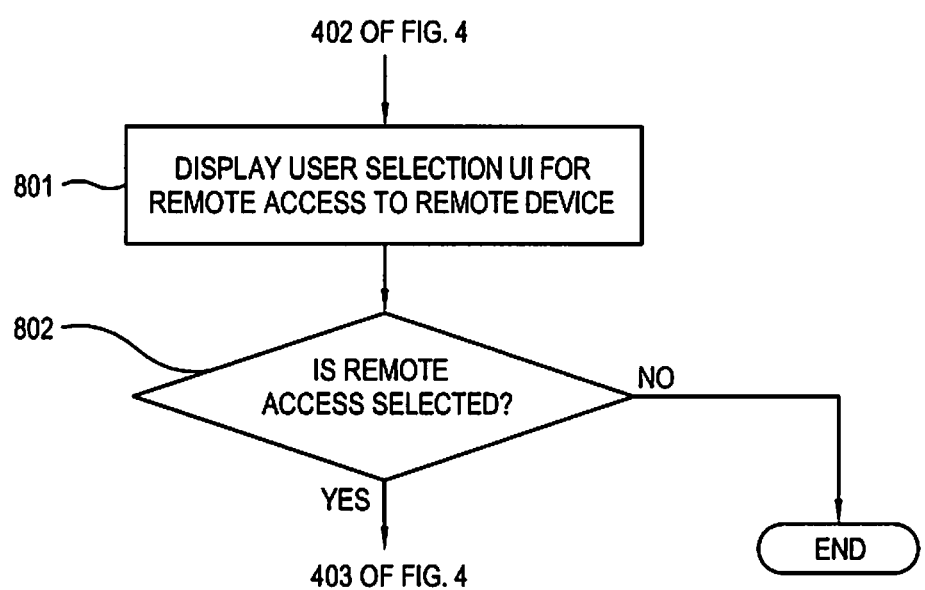
FIG. 8 is a flow chart showing a process performed by the mobile device shown in FIG. 3.

In yet another embodiment, control unit 36 may perform an additional process for providing the user with more prompt and convenient remote access to remote device 2. FIG. 8 is a flow chart showing a further process of control unit 36 according to one embodiment of the present invention. In connection with the process of control unit 36 shown in FIG. 8, illustration and description overlapping with those described with reference to FIG. 4 will be not repeated for the purpose of clarity.

Figure 4:
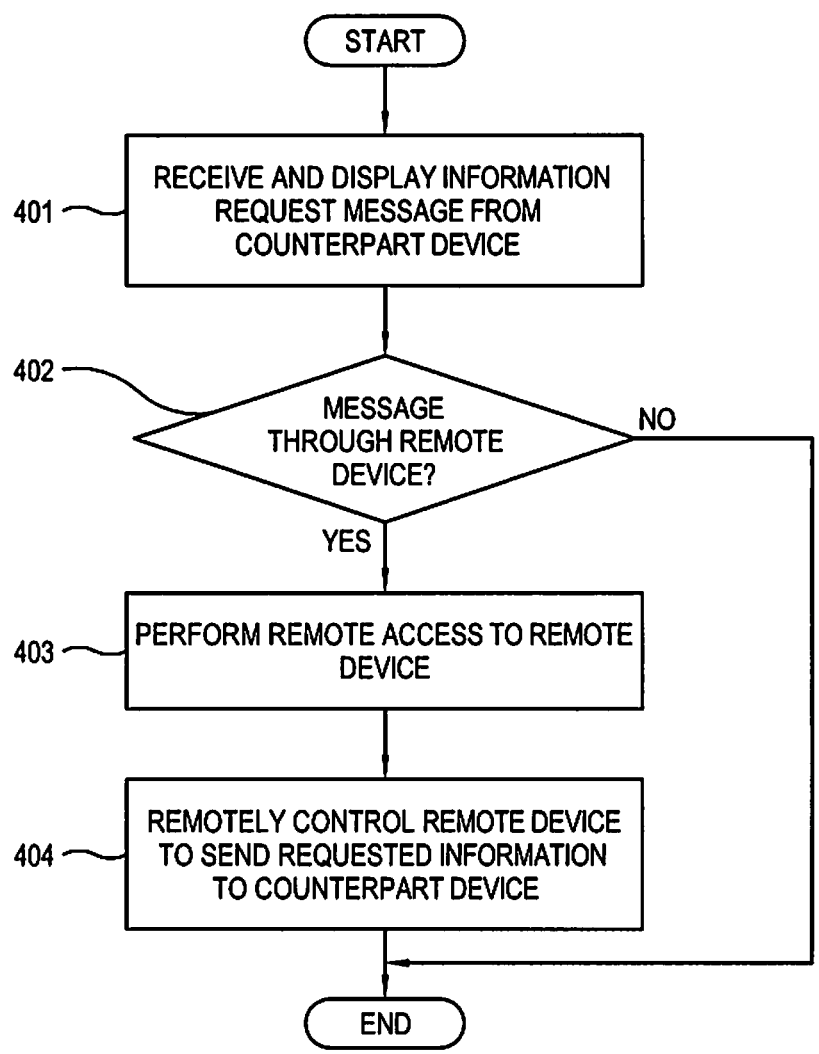
FIG. 4 is a flow chart showing an operation of the mobile device shown in FIG. 3.
Figure 5:
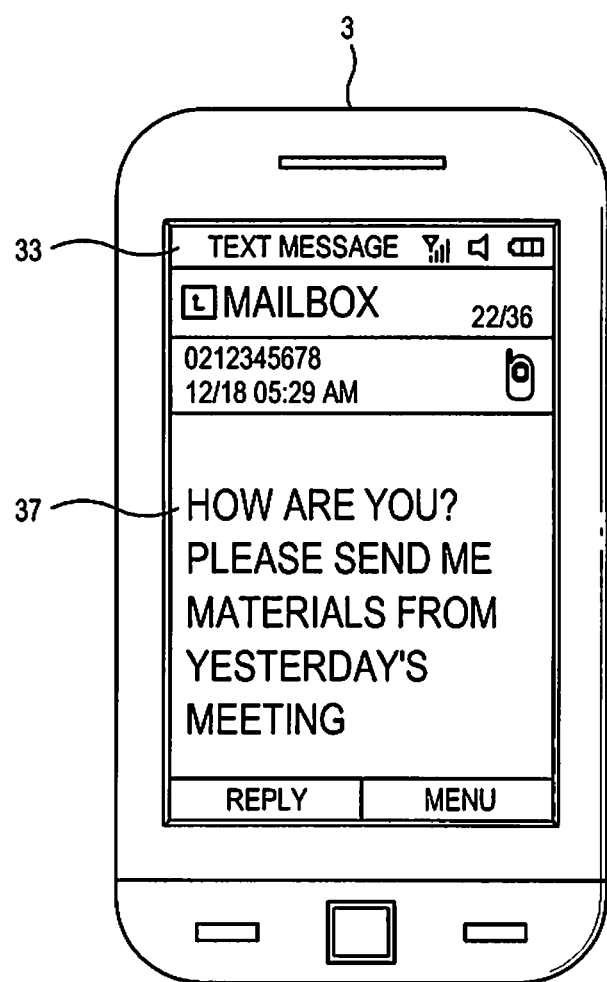
FIG. 5 is a diagram showing an example of a message from the counterpart device, displayed on the mobile device shown in FIG. 3.
Figure 9:
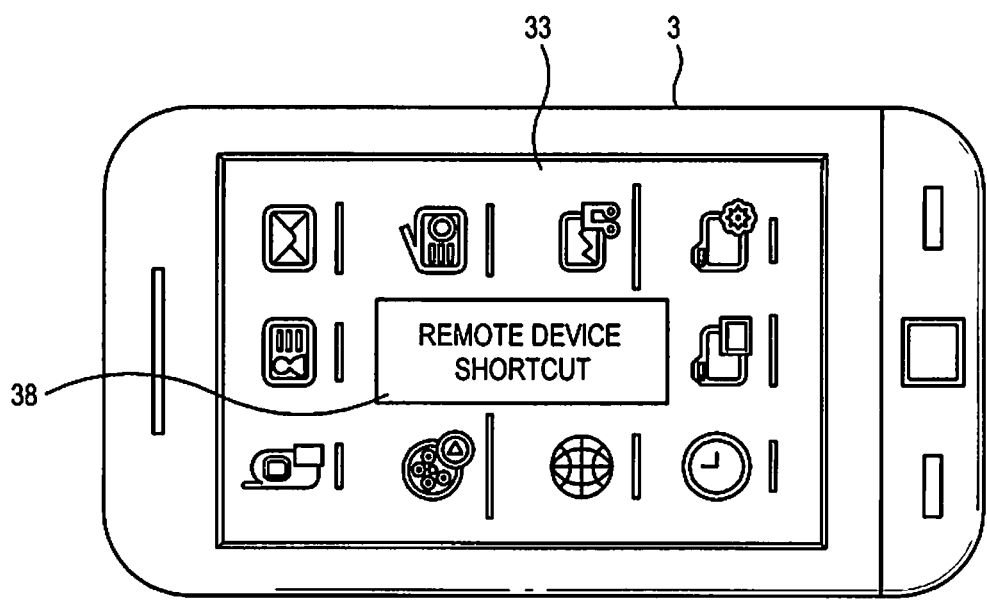
FIG. 9 is a diagram showing an example of a selection UI for remote access to the remote device, which is displayed on the mobile device shown in FIG. 3.

Referring to FIG. 8, if it is determined that the received message was delivered through remote device 2, as depicted by "YES" in 402 of FIG. 4, control unit 36 may display a selection (UI) for remote access to remote device 2 on display unit 33 in step 801. FIG. 9 shows an example of a selection UI 38 for remote access, which is displayed on display unit 33, according to one embodiment of the present invention. A user may more promptly and conveniently establish remote access to remote device 2 by selecting selection UI 38 for remote access to remote device 2, for example, by touching it.

Referring to FIG. 8 again, control unit 36 checks whether or not the user selects the selection UI 38 through user input unit 35 in step 802. If it is checked that the selection UI 38 is selected, remote access to remote device 2 is performed in step 403 of FIG. 4. Otherwise, the process ends.

In this embodiment, control unit 36 may include computer-executable software to enable the above-described processes, a random access memory (RAM) in which the computer-executable software is temporarily stored, and a microprocessor to execute the computer-executable software stored in the RAM. The computer-executable software of control unit 36 may include two or more programs, for example, an operating system program or firmware program and application programs supported by the operating system program.

In addition, mobile device 3 may further include a voice output unit (not shown) such as a speaker which produces voice based on the signals processed by the signal processing unit 32, a power supply unit (not shown) which supplies power to various components.

Although not shown, mobile device 3 according to another embodiment of the present invention will be described below. In this embodiment, control unit 36 may remotely control remote device 2 even when the message from counterpart device 1 is not attempted to be sent to remote device 2. For example, it is assumed in this embodiment that the message is attempted to be sent to a separate second remote device (not shown) of the user.

In this embodiment, the message from counterpart device 1 is attempted to be sent to the second remote device which then delivers the sent message to mobile device 3, similarly to that described with reference to FIG. 4. Alternatively, the second remote device may inform message-sending server 6 that the message cannot be received, based on a setting such as "user absence."

Next, upon checking that the message from counterpart device 1 was delivered through the second remote device, based on the above-mentioned reference information, mobile device 3 displays a list of accessible remote devices including remote device 2 on display unit 33. Next, mobile device 3 performs remote access to one selected from the displayed list of accessible remote devices in response to an input from the user.

Although several embodiments have been shown and described, it will be understood by those skilled in the art that changes in form and details may be made therein without departing from the principles and spirit of the invention, the scope of which is defined in the appended claims.

What is claimed is:

1. A mobile device comprising:
a communication interface configured to perform communication via a network;
a display configured to display an image; and
a processor configured to:
process a signal transmitted or received by the communication interface,
control the display to display the image based on the processed signal,
control the communication interface to transmit device information of the mobile device to a server, wherein the mobile device is able to receive a message from a remote device through the communication interface,
based on the server receiving reference information indicating that the remote device is set to a condition where the remote device is unable to receive the message, receive the message through a counterpart device and receive information indicating that the message has been delivered from the server, and
process the message to transmit a command to the remote device, such that the server remotely controls the remote device to transmit information requested by a user of the counterpart device corresponding to the command to the counterpart device.

2. The mobile device according to claim 1, wherein the processor is further configured to identify whether to receive the message based on an importance level of the message.

3. The mobile device according to claim 1, wherein the processor is further configured to check whether the message was delivered through the remote device and remotely access the remote device which delivered the message.

4. The mobile device according to claim 3, wherein the processor is further configured to receive the reference information corresponding to a condition of user absence in the remote device and check that the message was delivered through the remote device based on the reference information.

5. The mobile device according to claim 4, wherein the processor is further configured to:
display a selection user interface (UI) for remote access to the remote device on the display, and
remotely access the remote device in response to an input from the user through the selection UI.

6. The mobile device according to claim 1, wherein the processor is further configured to:
display a list of one or more accessible remote devices on the display, and
remotely access a remote device selected from the displayed list of accessible remote devices in response to an input from the user.

7. The mobile device according to claim 1, wherein the processor is further configured to remotely control the remote device to send information stored in the remote device to the counterpart device.

8. A control method of a mobile device, comprising:
performing communication via a network;
transmitting device information of the mobile device to a server, wherein the mobile device is able to receive a message from a remote device;
based on the server receiving reference information indicating that the remote device is set to a condition where the remote device is unable to receive the message, receiving the message through a counterpart device and receiving information indicating that the message has been delivered from the server; and
processing the message to transmit a command to the remote device, such that the server remotely controls the remote device to transmit information requested by a user of the counterpart device corresponding to the command to the counterpart device.

9. The control method according to claim 8, further comprising identifying whether to receive the message based on an importance level of the message.

10. The control method according to claim 8, further comprising:
checking whether the message was delivered through the remote device; and
remotely accessing the remote device which delivered the message.

11. The control method according to claim 10, wherein remotely accessing the remote device comprises:
receiving the reference information corresponding to a condition of user absence in the remote device; and
checking that the message was delivered through the remote device based on the reference information.

12. The control method according to claim 11, further comprising displaying a selection user interface (UI) for remote access to the remote device,
wherein remotely accessing the remote device comprises remotely accessing the remote device in response to an input from the user through the selection UI.

13. The control method according to claim 10, further comprising:
displaying a list of one or more accessible remote devices on a display; and
remotely accessing a selected remote device from the displayed list of accessible remote devices in response to an input from the user.

14. The control method according to claim 8, further comprising remotely controlling the remote device to send information stored in the remote device to the counterpart device.

\* \* \* \* \*